(12) United States Patent
Kashiwagi et al.

(10) Patent No.: US 7,651,120 B2
(45) Date of Patent: Jan. 26, 2010

(54) INFLATOR SECURING STRUCTURE AND AIRBAG SYSTEM

(75) Inventors: Daisuke Kashiwagi, Tokyo (JP); Ichiro Amamori, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/292,875

(22) Filed: Nov. 28, 2008

(65) Prior Publication Data

US 2009/0189372 A1 Jul. 30, 2009

(30) Foreign Application Priority Data

Jan. 30, 2008 (JP) ............................. 2008-019312

(51) Int. Cl.
*B60R 21/16* (2006.01)
(52) U.S. Cl. .................. 280/728.2; 280/731; 280/732
(58) Field of Classification Search ............. 280/728.2, 280/731, 732
See application file for complete search history.

(56) References Cited

U.S. PATENT DOCUMENTS

| | | | | |
|---|---|---|---|---|
| 5,851,023 A * | 12/1998 | Nagata et al. ............. | 280/728.3 |
| 5,947,510 A * | 9/1999 | Athon et al. ............. | 280/728.2 |
| 6,056,313 A * | 5/2000 | Lutz et al. ................ | 280/728.1 |
| 6,173,988 B1 * | 1/2001 | Igawa ...................... | 280/728.2 |
| 6,176,511 B1 * | 1/2001 | Adkisson et al. ......... | 280/728.2 |
| 6,220,624 B1 * | 4/2001 | Abraham et al. ......... | 280/728.2 |
| 6,361,064 B1 * | 3/2002 | Hopf et al. ............... | 280/728.1 |
| 6,422,589 B1 * | 7/2002 | Ostermann et al. ....... | 280/728.2 |
| 6,435,548 B2 * | 8/2002 | Suzuki et al. ............. | 280/732 |
| 6,481,742 B2 * | 11/2002 | Usami et al. ............ | 280/728.2 |
| 7,055,851 B2 * | 6/2006 | Takimoto et al. ......... | 280/730.1 |

FOREIGN PATENT DOCUMENTS

| JP | H05-065048 | 3/1993 |
|----|------------|--------|
| JP | H08-040174 | 2/1996 |
| JP | H08-099597 | 4/1996 |
| JP | H08-258663 | 10/1996 |

\* cited by examiner

*Primary Examiner*—Toan C To
(74) *Attorney, Agent, or Firm*—Manabu Kanesaka

(57) ABSTRACT

An inflator securing structure for securing an inflator having substantially cylindrical shape to a retainer in an airbag system includes a fixed shaft having a substantially D-shaped cross section and formed at one end of the inflator along an axial direction of the inflator; and a locking structure forming a locking hole having a substantially D shape and formed in the retainer so that the locking hole is engaged with the fixed shaft. One of the fixed shaft and the locking hole has at least one groove, and other of the fixed shaft and the locking hole has at least one convex portion so as to engage with the groove.

8 Claims, 10 Drawing Sheets

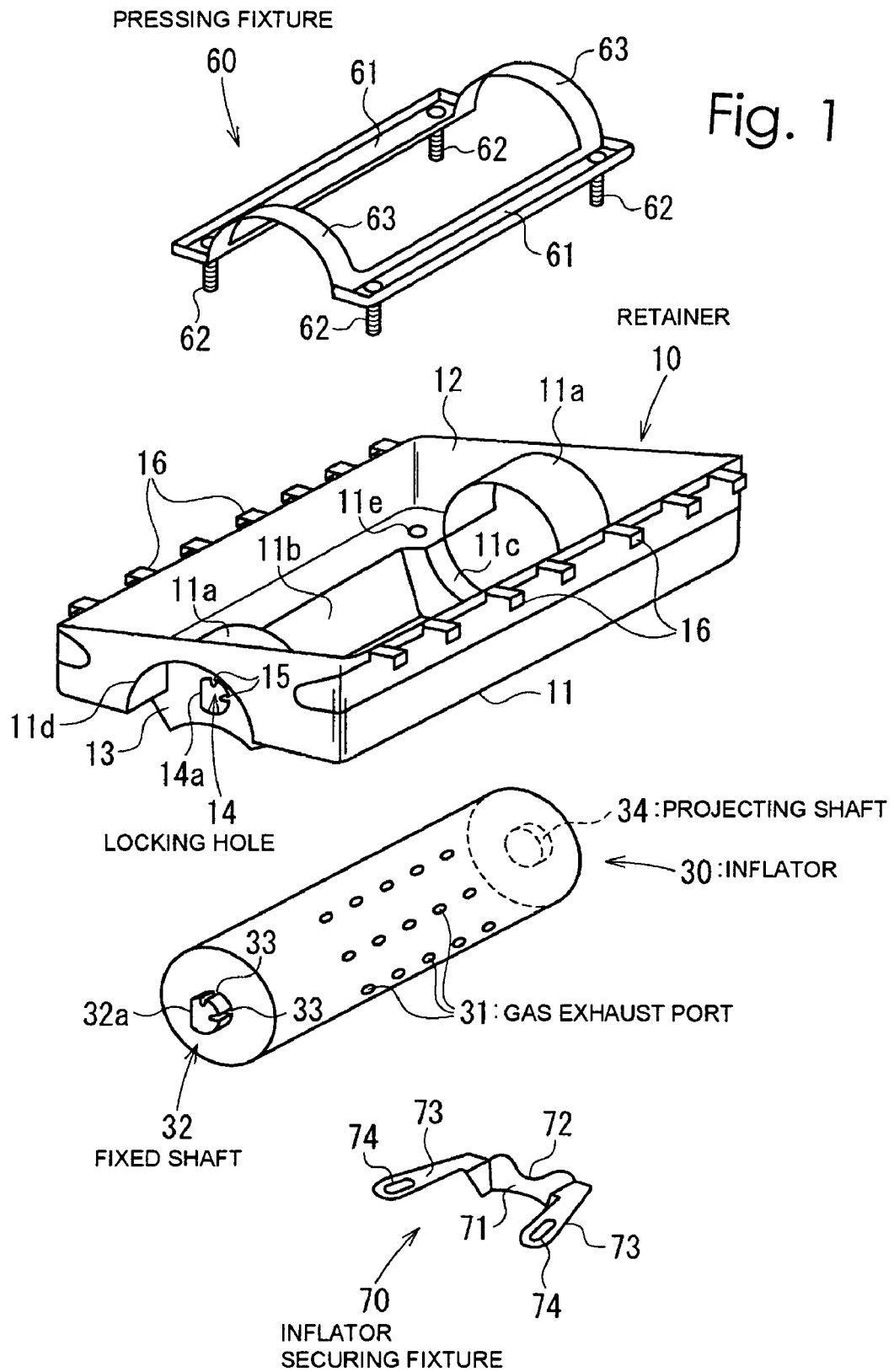

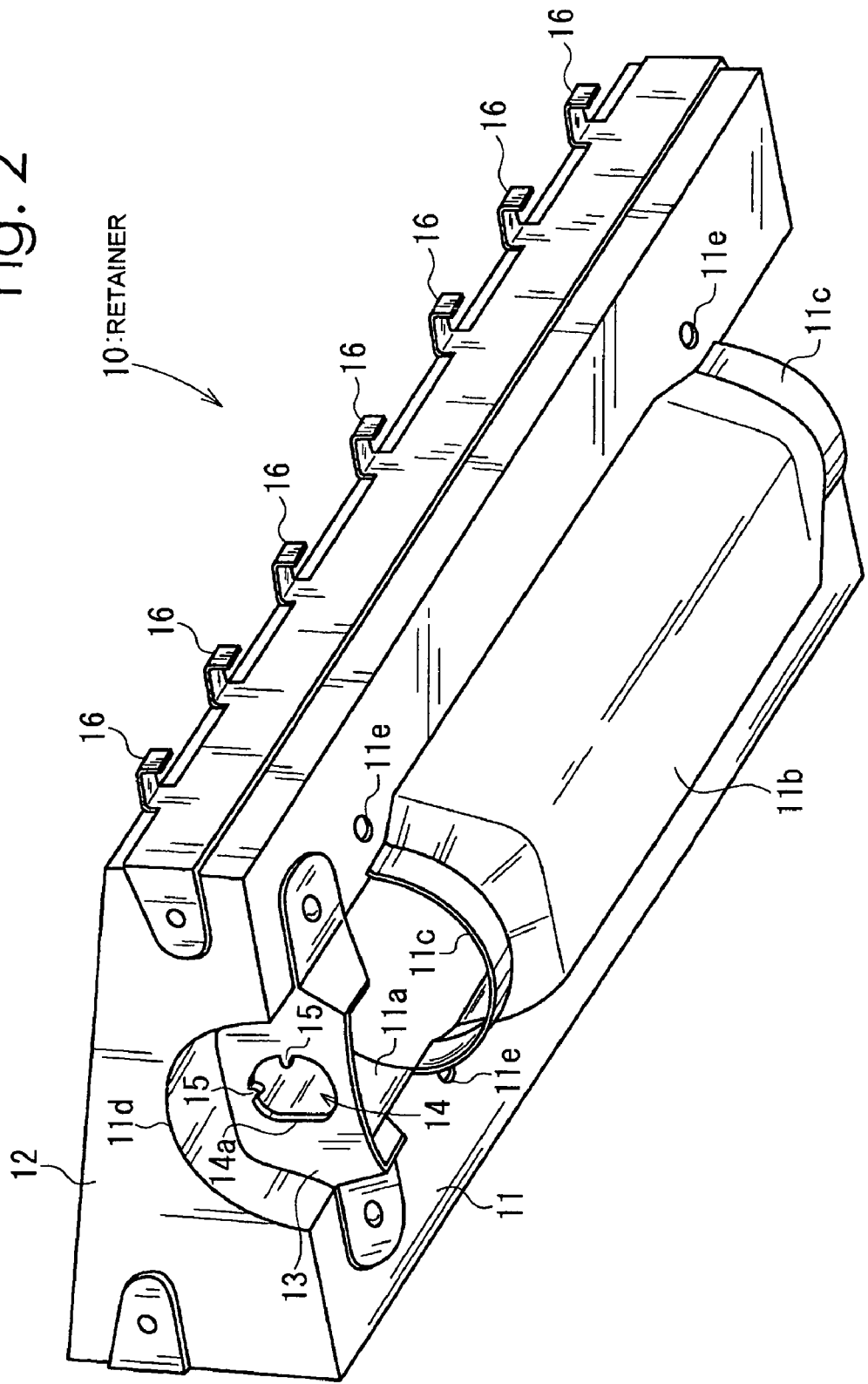

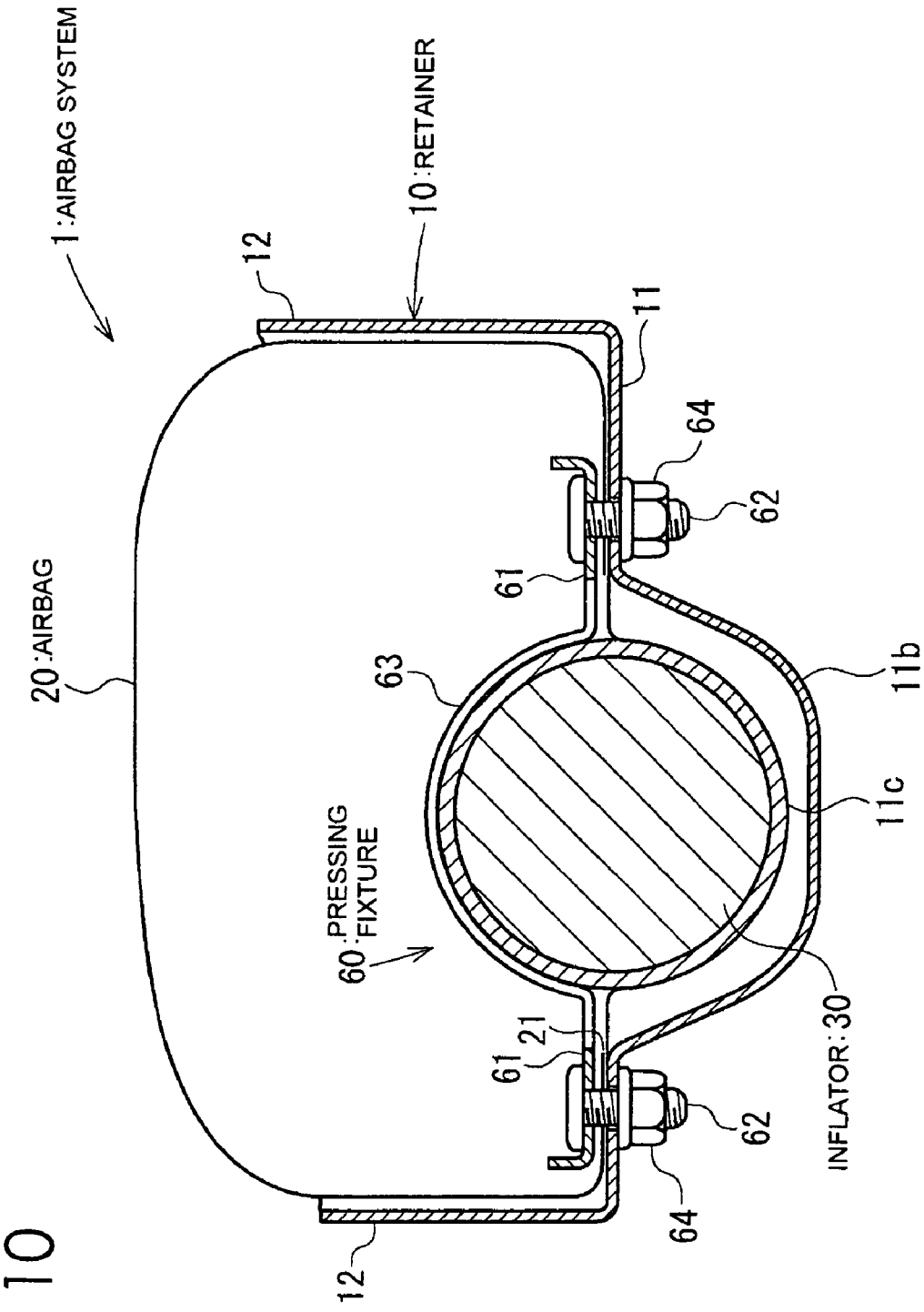

INFLATOR SECURING STRUCTURE AND AIRBAG SYSTEM

BACKGROUND OF THE INVENTION AND RELATED ART STATEMENT

The present invention relates to an inflator securing structure for securing a substantially cylindrically-shaped inflator to a retainer in an airbag system. More specifically, it relates to an inflator securing structure in which the inflator has a fixed shaft having a substantially D-shaped cross section projecting at its one end along the axial direction thereof, and the fixed shaft is engaged in a substantially D-shaped locking hole provided in a retainer, thereby allowing the inflator to be secured to the retainer so that the inflator is substantially unrotatable about its axis. The present invention also relates to an airbag system in which the inflator is secured to the retainer by means of the inflator securing structure.

For the purposes of the present invention, the sentence "the inflator is substantially unrotatable about its axis" means that the inflator is somewhat rotatable by a degree of clearance (play) between the flat surface on the circumference of the fixed shaft and the chordal side of the locking hole when the fixed shaft is engaged in the locking hole.

An airbag system installed on a passenger seat side or the like in a motor vehicle includes an airbag and an inflator for inflating the airbag. The airbag and the inflator are secured to a retainer.

The inflator has a substantially cylindrical shape and includes a gas exhaust port provided at its circumference along the longitudinal axis thereof.

As a cylindrically-shaped inflator securing structure, Patent Document 1 (Japanese Unexamined Patent Application Publication No. 5-65048) describes an inflator securing structure in which an inflator has a fixed shaft having a substantially D-shaped cross section projecting at its one end along the axial direction thereof, the cross section being perpendicular to the axial direction of the inflator, and the fixed shaft is engaged in a substantially D-shaped locking hole provided in a retainer, thereby allowing the inflator to be secured to the retainer.

Patent Document 1 describes that, when the fixed shaft is engaged in the locking hole, a flat circumferential surface of the fixed shaft and a chordal side of the locking hole symmetrically face each other, thereby allowing the inflator to be secured to a retainer with a gas exhaust port oriented toward a predetermined direction so that the inflator is substantially unrotatable about its axis.

The inflator securing structure described in Patent Document 1 has a predetermined clearance (play) created for design purposes between the circumference of the fixed shaft and the inner circumference of the locking hole. This clearance allows the inflator to be rotatable about its axis by the degree of that clearance.

Generally, the clearance between the flat surface on the circumference of the fixed shaft and the chordal side of the locking hole is approximately 0.5 mm when the fixed shaft is engaged in the locking hole. The allowable range of the resultant play in the rotational direction of the inflator, namely, angular tolerance is +/− 3 through 5 degrees.

With the recent reduction in size of airbag systems, there has been a tendency toward using an inflator with a smaller diameter. The use of such inflator results in a reduction in diameter of a fixed shaft provided on the inflator. Although the diameter of a locking hole is dependent on the diameter of the fixed shaft, there must be almost the same clearance created for design purposes between the fixed shaft and the locking hole regardless of whether the fixed shaft has a larger diameter or not. For this reason, the fixed shaft with a smaller diameter relatively produces a greater clearance between the fixed shaft and the locking hole relative to the diameter of the fixed shaft, resulting in a greater degree of rotation of the fixed shaft inside the locking hole. Accordingly, the fixed shaft with the smaller diameter may cause inflator to create play greater than a predetermined rotational tolerance range.

Accordingly, the objective of the present invention is to provide an inflator securing structure which allows an inflator to play in the rotational direction within the predetermined rotational tolerance range even when a fixed shaft with a smaller diameter is employed, as well as an airbag system which includes the inflator secured to a retainer by means of the inflator securing structure.

Further objects and advantages of the invention will be apparent from the following description of the invention.

SUMMARY OF THE INVENTION

The inflator securing structure disclosed in a first aspect of the invention is an inflator securing structure having a substantially cylindrically-shaped inflator secured to a retainer of an airbag, the inflator including a fixed shaft having a substantially D-shaped cross section provided at its one end along the axial direction thereof, and the retainer including a substantially D-shaped locking hole formed therein where the fixed shaft is engaged. A convex portion is formed so as to project from a circumferential surface of the fixed shaft or the inner circumference of the locking hole toward the other, and the other part has a concave portion formed therein in which the convex portion is engaged.

As to a second aspect of the invention, in the inflator securing structure according to the first aspect, the convex portion is formed in the inner circumference of the locking hole so as to project toward the center of the locking hole, and the concave portion includes a groove formed in the circumference of the fixed shaft and extending in the axial direction of the inflator. The groove faces an end surface of the fixed shaft at the distal end thereof.

With respect to a third aspect of the invention, the airbag system includes an airbag, an inflator for inflating the airbag, and a retainer having the airbag and the inflator mounted therein, wherein the inflator is secured to the retainer by means of the inflator securing structure according to the first or second aspect of the invention.

In the inflator securing structure and airbag system of the present invention, an inflator fixed shaft has a D-shaped cross section to be engaged in a D-shaped retainer locking hole. It also allows a convex portion projecting from one of a circumferential surface of the fixed shaft and the inner circumference of the locking hole toward the other to be engaged with a concave portion formed in the other. In other words, the present invention allows a flat surface on the circumference of the fixed shaft to symmetrically face a chordal side of the locking hole, and it also allows the convex portion to be engaged with the concave portion, thereby placing double restrictions on the rotation of the inflator. As a result, this configuration further reduces the inflator play in the rotational direction compared with the inflator securing structure which places restrictions on the rotation of an inflator only by allowing a flat surface on the circumference of the fixed shaft to symmetrically face the chordal side of the locking hole. This enables inflator play in the rotational direction to be within the predetermined rotational tolerance range even when the smaller diameter fixed shaft is used.

In the present invention, since an inflator fixed shaft has a substantially D-shaped cross section, the position of a flat surface on a circumference of the fixed shaft can be used as an indicator for the correct inflator position, resulting in enhanced workability for installation of the inflator on a retainer. If an inflator is of type provided at both ends thereof with a connector, the connector at the side of a fixed shaft has a substantially D-shaped cross section substantially similar to the fixed shaft, while the connector at the opposite side has a non-hole structure like an ordinary inflator, preventing the inflator from being inserted to and installed on the retainer in a wrong position.

In the second aspect, a fixed shaft can be inserted into a locking hole while a convex portion on the inner circumference of the locking hole is engaged with a groove on the circumference of the fixed shaft.

BRIEF DESCRIPTION OF THE DRAWINGS

FIG. 1 is an exploded perspective view of an inflator securing structure and an airbag system according to an embodiment of the present invention.

FIG. 2 is a perspective view, as viewed from below a retainer of the airbag system.

FIG. 10 is a sectional view of the same portion as FIG. 9, when the pressing fixture is attached.

DETAILED DESCRIPTION OF PREFERRED EMBODIMENTS

Embodiments will be described below with reference to the drawings.

Figure 3A:
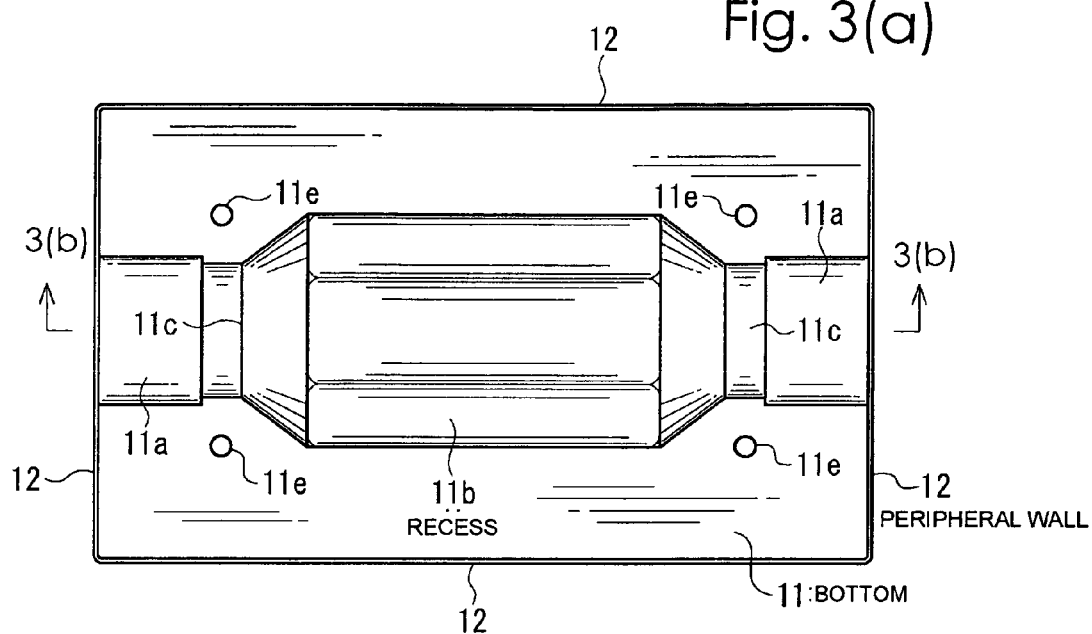
FIG. 3(a) is a plan view of the retainer.
Figure 3B:
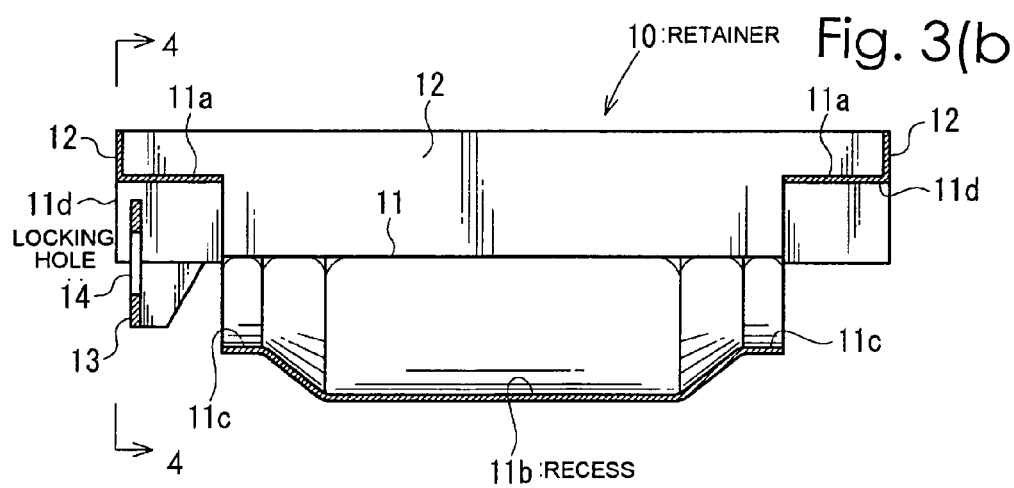
FIG. 3(b) is a sectional view taken along the line 3(b)-3(b) of FIG. 3(a).
Figure 4:
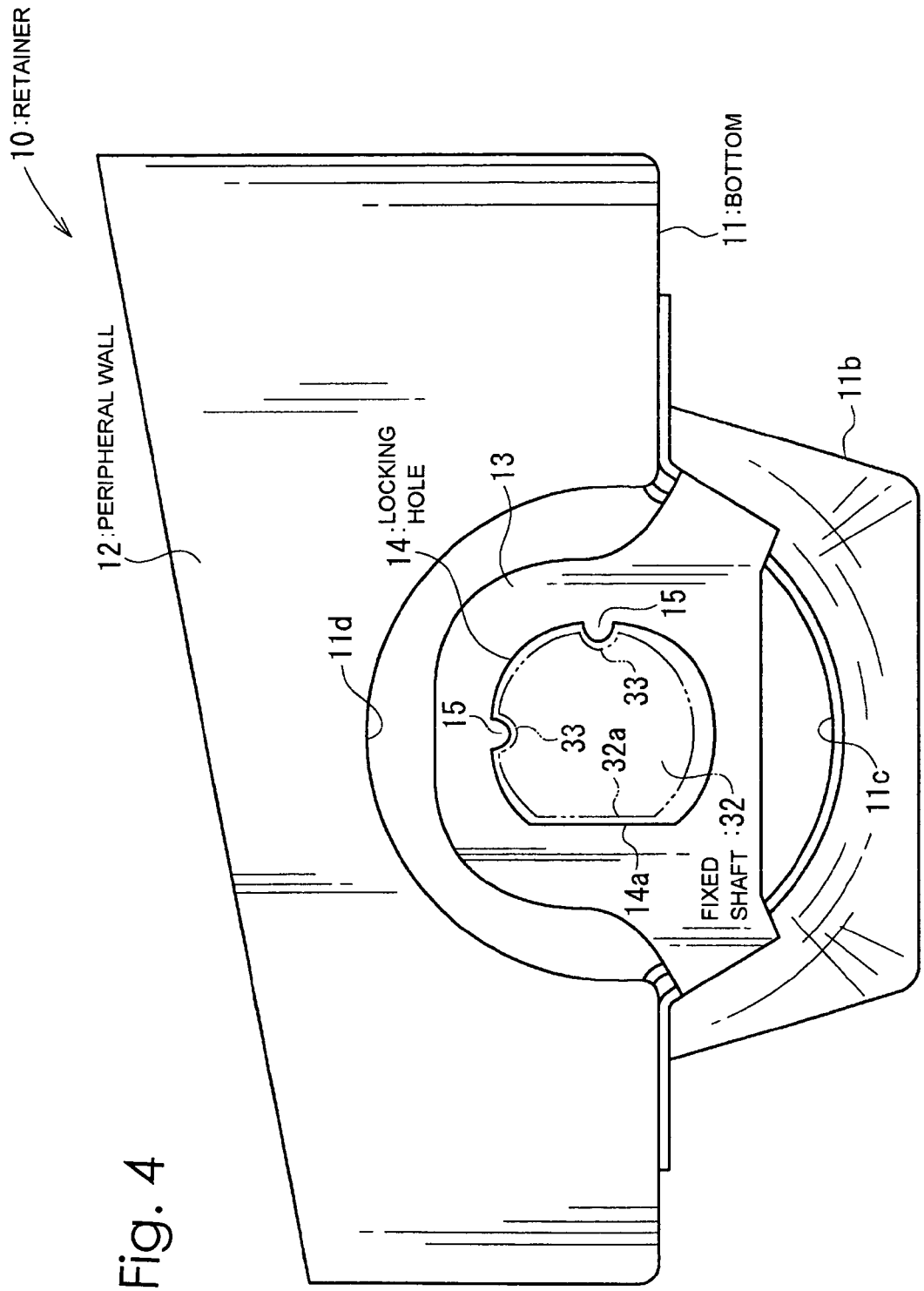
FIG. 4 is a view taken from line 4-4 of FIG. 3(b).
Figure 5:
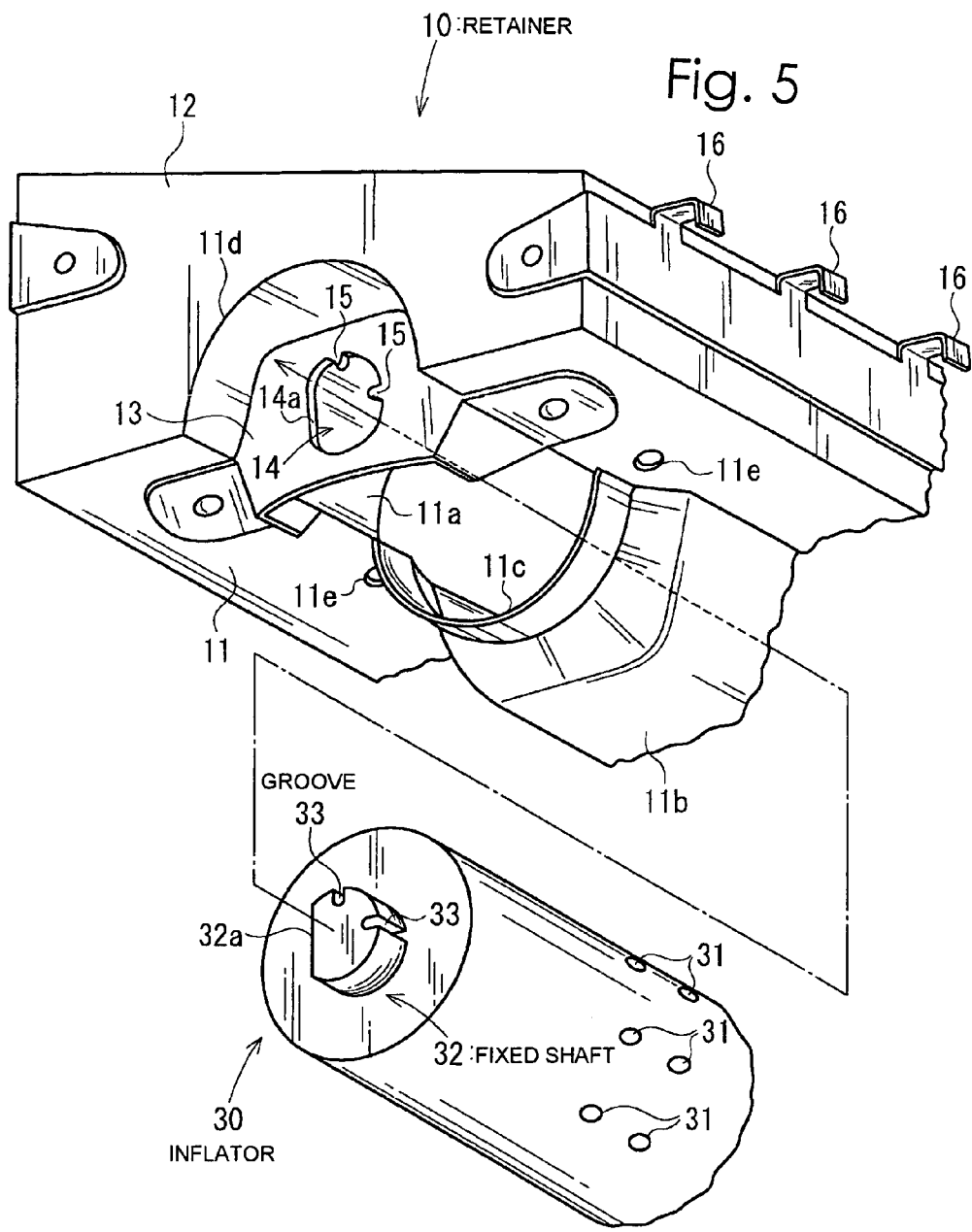
FIG. 5 is an exploded perspective view of the inflator securing structure.
Figure 6:
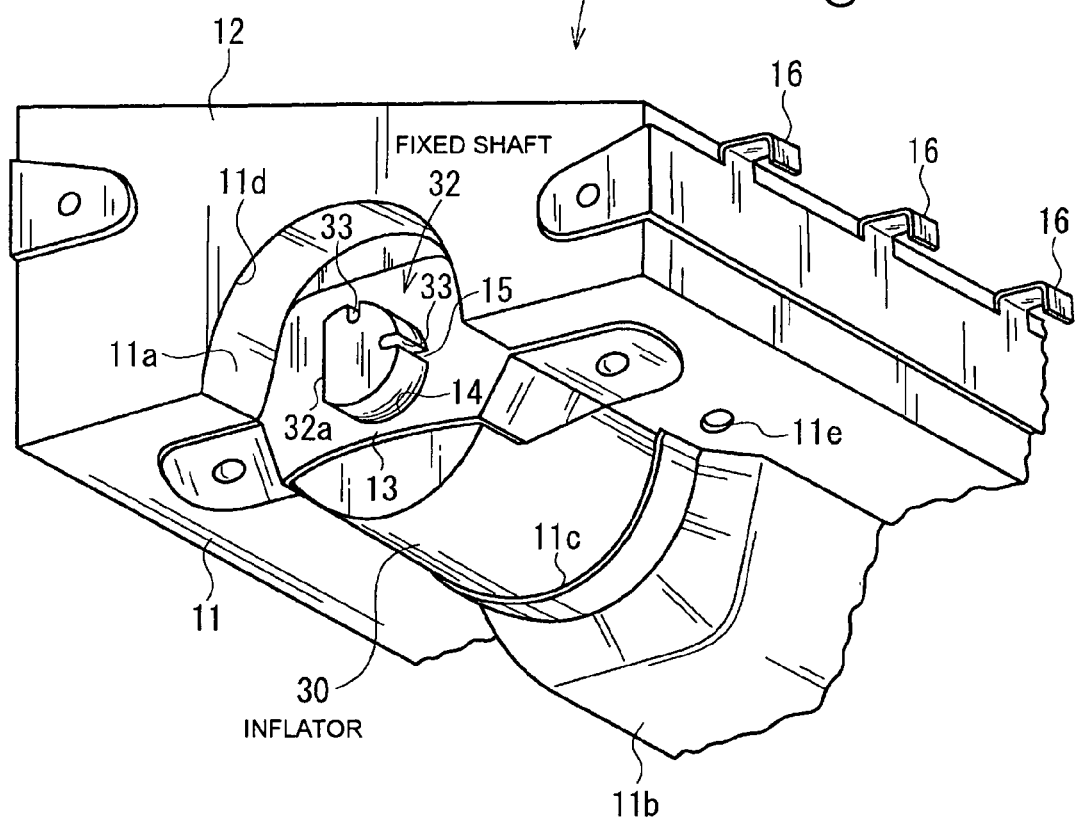
FIG. 6 is a perspective view of the same portion as FIG. 5, when the inflator is attached.
Figure 7:
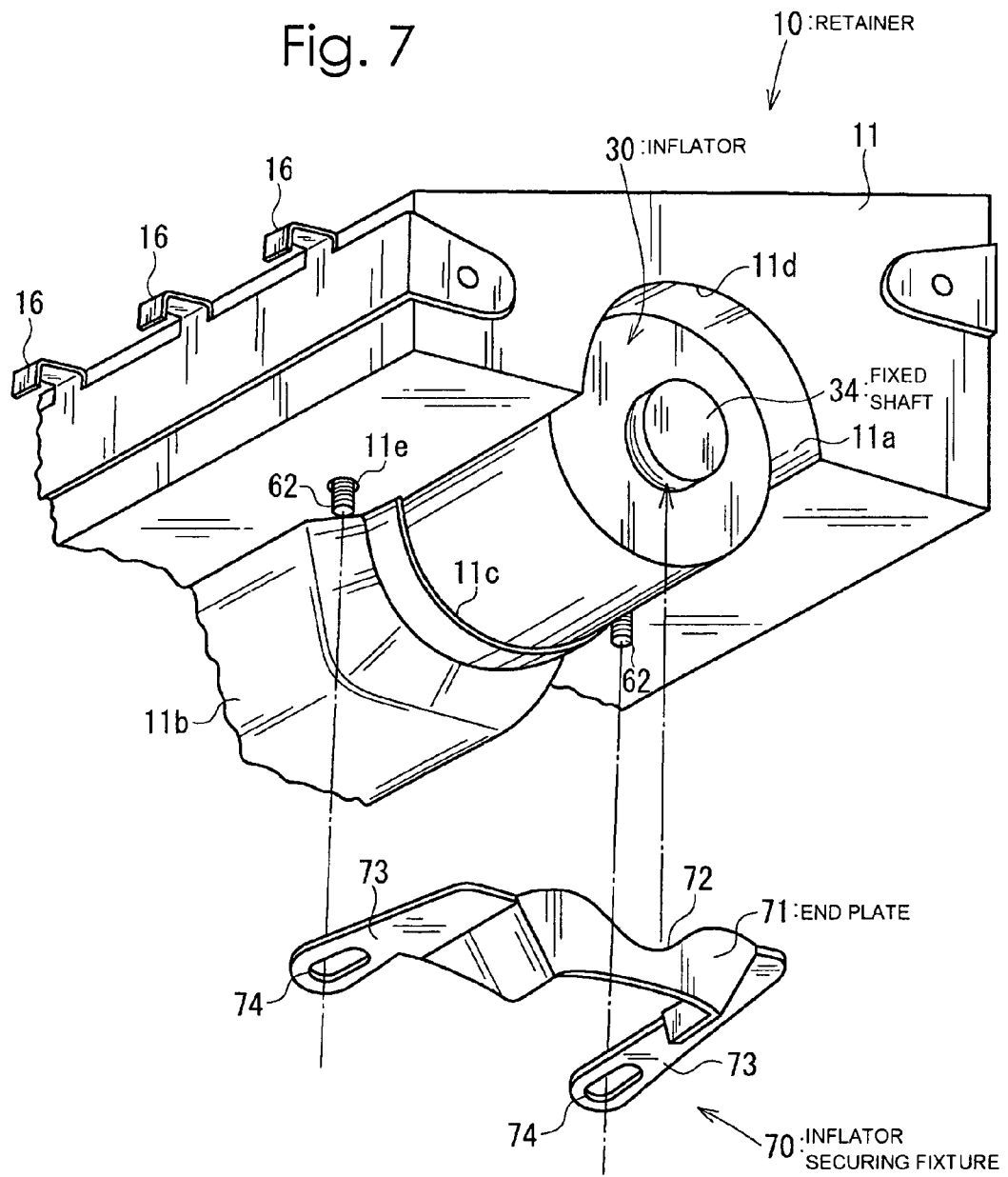
FIG. 7 is an exploded perspective view of the retainer and the inflator securing fixture.
Figure 8:
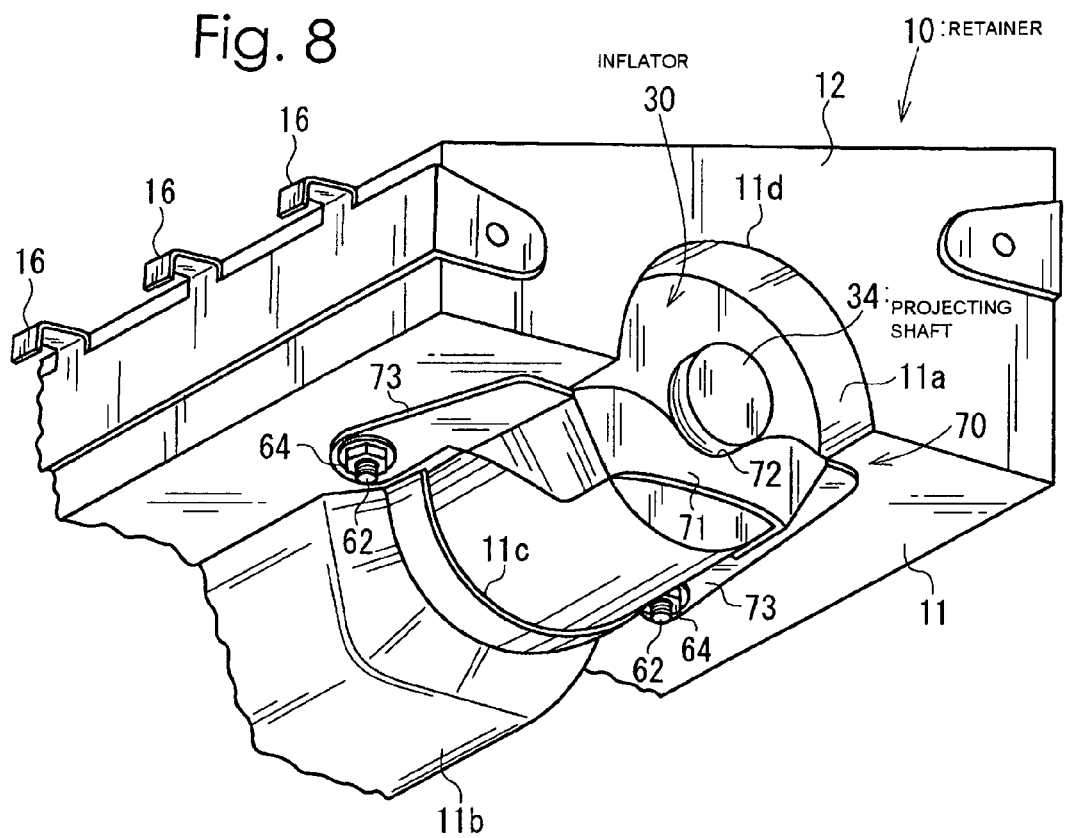
FIG. 8 is a perspective view of the same portion as FIG. 7, when the inflator securing fixture is attached.
Figure 9:
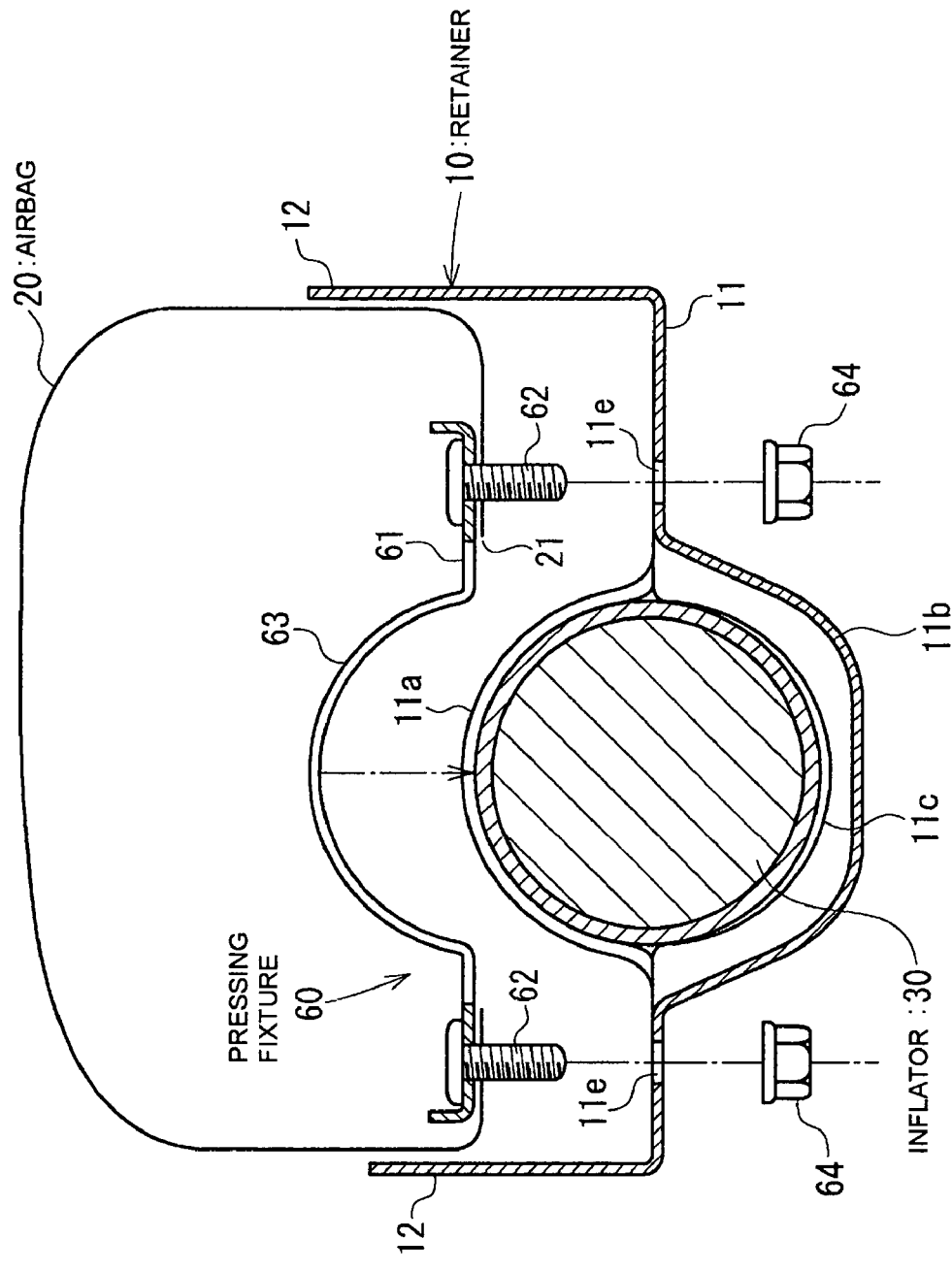
FIG. 9 is an exploded sectional view of a pressing fixture and the retainer.

FIG. 1 is an exploded perspective view of an inflator securing structure and an airbag system according to an embodiment of the present invention. FIG. 2 is a perspective view, as viewed from below a retainer of the airbag system. FIG. 3(a) is a plan view of the retainer. FIG. 3(b) is a sectional view taken along line 3(b)-3(b) of FIG. 3(a). FIG. 4 is a view taken along line 4-4 of FIG. 3(b). FIG. 5 is an exploded perspective view of the inflator securing structure. FIG. 6 is a perspective view of the same portion as FIG. 5, when an inflator is attached therewith. FIG. 7 is an exploded perspective view of the retainer and an inflator securing fixture. FIG. 8 is a perspective view of the same portion as FIG. 7, when the inflator securing fixture is attached. FIG. 9 is an exploded sectional view of a pressing fixture and the retainer. FIG. 10 is a sectional view of the same portion as FIG. 9, when the pressing fixture is attached therewith.

In this embodiment, an airbag system 1 is a passenger airbag to be used a motor vehicle.

The airbag system 1 has an airbag housing space formed inside, including an open-topped retainer 10 having an opening for airbag deployment formed at the top thereof, an airbag 20 housed in the retainer 10, an inflator 30 mounted at the bottom of the retainer 10, a pressing fixture 60 for securing the airbag 20 to the retainer 10, an inflator securing fixture 70 for securing the inflator 30 to the retainer 10, and a lid (not shown) for covering the top opening of the retainer 10.

As shown in FIG. 1, the inflator 30 has a substantially cylindrical shape and has a plurality of gas exhaust ports 31 provided at the outer circumference thereof.

The inflator 30 has a fixed shaft 32 projecting at its one end (leading end) along the axial direction thereof for securing the inflator 30 to the retainer 10 so as to be unrotatable. As shown in FIG. 5, the fixed shaft 32 has a substantially D-shaped cross section perpendicular to the axial direction of the inflator 30. In other words, the outer circumference of the fixed shaft 32 is formed of a semi-circular circumference (reference numeral omitted) of a substantial semi-cylinder having a substantially C-shaped section and extending substantially coaxially with the inflator 30, and a flat surface 32a connecting both ends of the semi-circular circumference of the substantial semi-cylinder.

In this embodiment, the inflator 30 is installed on the retainer 10 so that its axial direction is substantially parallel to the direction in which a bottom portion 11 of the retainer 10 extends, and so that the flat surface 32a extends substantially vertically.

In this embodiment, the fixed shaft 32 includes a groove 33 as a concave portion extending along the axial direction of the inflator 30. In this embodiment, two grooves 33 are circumferentially spaced in the semi-circular circumference of the substantial semi-cylinder, as shown in FIGS. 4 through 6. More specifically, in this embodiment, regarding the semi-circular circumference of the fixed shaft 32, a top, provided when the inflator 30 is installed in the retainer 30, and a side opposing the flat surface 32a across the center of the fixed shaft 32 have grooves 33 so that the grooves are disposed so as to be apart from each other by approximately 90 degrees in phase angle. However, the number of the grooves 33 and their disposition are not limited to this.

In this embodiment, the inflator 30 includes a projecting shaft 34 projecting at the other end (trailing end) along the axial direction thereof, the projecting shaft being engaged with the inflator securing fixture 70. The projecting shaft 34 is disposed so as to be substantially coaxially with the inflator 30. The projecting shaft 34 has a substantially circular cross section perpendicular to the axial direction of the inflator 30.

In this embodiment, the retainer 10 includes a bottom portion 11 having a substantially rectangular planar shape, and a periphery wall 12 standing upward from the circumference of the bottom portion 11, as shown in FIGS. 2, 3(a), and 3(b).

The bottom portion 11 includes an upward-facing semi-circular curved portion 11a formed at both lengthwise ends thereof. Also, it includes a recess 11b formed between these semi-circular curved portions 11a, the recess 11b being downwardly concave. Both end edges of the recess 11b, opposing the upward-facing semi-circular curved portion 11a, include a downward-facing semi-circular curved portion 11c. The upward-facing semi-circular curved portion 11a and the downward-facing semi-circular curved portion 11c are arranged so as to be coaxial with each other.

As shown in FIG. 9, the inner diameter of the upward-facing semi-circular curved portion 11a is substantially equal to the diameter of the inflator 30. In this embodiment, the inner diameter of the downward-facing semi-circular curved portion 11c is somewhat larger than the diameter of the inflator 30. As shown in FIG. 9, a portion within the recess 11b between the downward-facing semi-circular curved portions 11c is larger in width and depth than the inflator 30.

As shown in FIGS. 3(b) and 4, an upward-facing circular cutout 11d is formed in each of portions of the peripheral wall 12 which is along the short sides of the bottom portion 11, the cutout 11d being along the inner circumference of the upward-facing semi-circular curved portion 11a.

The bottom portion 11 is provided with bolt insertion holes 11e through which stud bolts 62 for a pressing fixture 60 mentioned below are inserted. In this embodiment, the bolt insertion holes 11e are disposed in close vicinity of the downward-facing semi-circular curved portion 11c so as to be opposite each other across the curved portion 11c, as shown in FIG. 3(a).

As shown in FIG. 9, the inflator 30 is inserted between the upward-facing semi-circular curved portions 11a and the downward-facing semi-circular curved portion 11c, while its intermediate portion along its axial direction is disposed in the recess 11b. The gas exhaust ports 31 are disposed at a portion of the circumference of the inflator 30, the portion corresponding to the position of the recess 11b.

In this embodiment, one of the upward-facing semi-circular curved portions 11a into which the proximal end of the inflator 30 is inserted includes a stopper plate 13 provided at the inner circumference thereof, the stopper plate 13 overlying the end face of the inflator 30, as shown in FIG. 3(b). In this embodiment, the stopper plate 13 is secured to the bottom portion 11 of the retainer 10 by means of spot welding or the like although the means of securing the stopper plate 13 is not limited to this. The stopper plate 13 may be secured by means of bolt fixation.

The stopper plate 13 includes a locking hole 14 formed therein for allowing the engagement with the fixed shaft 32 of the inflator 30. The locking hole 14 includes an opening having a substantial D-shape which is substantially similar to the cross-sectional shape of the fixed shaft 32. In other words, as shown in FIG. 4, the locking hole 14 includes a substantially C-shaped, substantially semi-circular side (reference numerals omitted) and a chordal side 14a connecting both ends of the substantially semi-circular side. In this embodiment, the chordal side 14a extends substantially vertically.

As shown in FIG. 4, the locking hole 14 has a diameter somewhat larger than the fixed shaft 32. As a result, a predetermined clearance (play) is created between the inner circumference of the locking hole 14 and the outer circumference of the fixed shaft 32 when the fixed shaft 32 is engaged with the locking hole 14.

Preferably, the clearance between the chordal side 14a of the locking hole 14 and the flat surface 32a of the fixed shaft 32 is 0 to 3 mm, more preferably, 0.5 to 1.7 mm when the fixed shaft 32 is engaged with the locking hole 14. Besides, the angular tolerance of the inflator 30 is preferably +/−0 to 4 degrees, more preferably, 0 to 3 degrees when the fixed shaft 32 is engaged with the locking hole 14.

The locking hole 14 includes a tongue-shaped convex portion 15 projecting from the inner circumference thereof. The convex portion is engaged with the groove 33 of the fixed shaft 32. In this embodiment, one or two convex portions 15 are provided at positions corresponding to the grooves 33 of the fixed shaft 32. In other words, in this embodiment, the convex portions 15 are disposed at the top of the substantially semi-circular circumferential side of the locking hole 14 and a side opposite to the flat surface 32a across the center of the fixed shaft 32 so as to be apart from each other by approximately 90 degrees in phase angle about the center of the fixed shaft 32.

The retainer 10 includes hooks 16 projecting from the peripheral wall 12 thereof for allowing the lid to be secured to the retainer 10. As shown FIG. 1, in this embodiment, the hooks 16 are disposed on the upper edge of the peripheral wall 12 extending along the long side of the retainer 10. However, this does not limit the disposition of the hooks 16. Note that the illustrations of the hooks 16 are omitted in FIGS. 3(a), 3(b), 4, 9, and 10.

As shown in FIGS. 9 and 10, the pressing fixture 60 includes an airbag pressing frame 61 for pressing the periphery of a gas inlet 21 in an airbag 20 against a bottom portion 11 around the recess 11b in the retainer 10, a plurality of stud bolts 62 projecting downward from the airbag pressing frame 61, and an upward-facing semi-circular inflator pressing frame 63 resting on both opposing sides of the airbag pressing frame 61 across the recess 11b. The positions of the stud bolts 62 correspond to the positions of the bolt insertion holes 11e in the retainer 10. The gas inlet 21 in the airbag 20 is provided at the periphery thereof with a bolt insertion hole (reference numerals omitted) through which each of the stud bolts 62 is inserted. The inner diameter of the inflator pressing frame 63 is substantially equal to the diameter of the inflator 30.

As shown in FIGS. 7 and 8, the inflator securing fixture 70 includes an end plate 71 overlying a trailing end face of the inflator 30, a cutout 72 formed at the upper edge of the end plate 70 and engaged from beneath with the projecting shaft 34 of the inflator 30, a pair of leg-shaped flaps 73 underlying the bottom portion 11 of the retainer 10 at both sides of the semi-circular curved portions 11a and 11c with which the inflator 30 is engaged at its trailing end, and a bolt insertion hole 74 formed in the leg-shaped flap 73. The positions of the bolt insertion holes 74 correspond to the positions of the bolt insertion holes 11e provided at both sides of the downward-facing semi-circular curved portion 11c with which the inflator 30 is engaged at its trailing end.

The assembly procedure for the airbag system 1 is described below.

The inflator 30 with the fixed shaft 32 as the lead is inserted between the upward-facing semi-circular curved portion 11a and the downward-facing semi-circular curved portion 11c, disposed at the side where no stopper plate 13 is provided in the retainer 10. Then, the leading end side of the inflator 30 is placed in the retainer 10 so as to be inserted between the upward-facing semi-circular curved portion 11a and the downward-facing semi-circular curved portion 11c.

The fixed shaft 32 is inserted into the locking hole 14 so that the flat surface 32a of the fixed shaft 32 mates with the chordal side 14a of the locking hole 14 and, at the same time, the convex portion 15 in the locking hole 14 engages with the groove 33 in the fixed shaft 32. The insertion of the fixed shaft 32 into the locking hole 14 is terminated when the leading end face of the inflator 30 is brought into contact with the stopper plate 13 or the convex portion 15 is brought into contact with the end face at which the groove 33 terminates.

This allows the inflator 30 to be locked to the retainer 10 so as to be substantially unrotatable about its axis, with the gas exhaust ports 31 of the inflator 30 being oriented toward a predetermined direction.

Then, as shown in FIG. 9, the stud bolts 62 in the pressing fixture 60 are inserted through bolt insertion holes in the airbag 20 from inside of the airbag 20, and the airbag pressing frame 61 in the pressing fixture 60 is placed over the periphery of the gas inlet 21. Then, the airbag 20 is disposed in the retainer 10, and the airbag pressing frame 61 is pressed down so that the periphery of the gas inlet 21 is pressed against the bottom portion 11 of the retainer 10, while the stud bolts 62 are inserted through the bolt insertion holes 11e.

The airbag 20 may be folded in advance before being mounted on the retainer, or be folded after being mounted on the retainer 10.

Then, the inflator securing fixture 70 is installed on the trailing end of the inflator 30. At this time, as shown in FIGS. 7 and 8, the end plate 71 is placed over the trailing end of the inflator 30, while the cutout 72 is engaged with the projecting shaft 34 of the inflator 30. After that, the leg-shaped flaps 73 are installed so as to underlie the bottom portion 11 of the retainer 10, while the stud bolts 62 extending below the retainer 10 through the bolt insertion holes 11*e* are inserted through the bolt insertion holes 74, the bolt insertion holes 11*e* being disposed at both sides of the downward-facing, semi-circular curved portion 11*c* with which the inflator 30 is engaged at its trailing end.

After that, the pressing fixture 60 and the inflator securing fixture 70 are secured to the retainer 10 by tightening a nut 64 upon each of the stud bolts 63. This allows the periphery of the gas inlet 21 in the airbag 20 to be held between the airbag pressing fixture 61 of the pressing frame 60 and the bottom portion 11 of the retainer 10, as well as allows the inflator 30 to be secured at the both ends thereof by means of the stopper plate 13 and the inflator securing fixture 70 so that the inflator 30 remains fixed between the semi-circular curved portions 11*a* and 11*c*.

In this embodiment, the tightening of the nut 64 upon each of the stud bolts 63 allows the inflator pressing frame 63 of the pressing fixture 60 to press down on the inflator 30, causing the inflator 30 to be secured to the inside of the semi-circular curved portion 11*c*.

After that, a lid is placed upon the retainer 10 for covering the top face and secured to the retainer 10 with the hooks 16, thereby constituting the airbag system 1.

The lid is designed in such a manner as to break off and expose the top face of the retainer 10 when the airbag 20 inflates.

As mentioned above, in the inflator securing structure for the airbag system 1, the fixed shaft 32 in the inflator 30 having a D-shaped cross section is engaged with the D-shaped locking hole 14 in the retainer 10, while each of the convex portions 15 projecting from the inner circumference of the locking hole 14 is engaged with each of the grooves 33 formed at the outer circumference of the fixed shaft 32.

In other words, in the inflator securing structure mentioned above, the flat surface 32*a* on the circumference of the fixed shaft 32 arranged to symmetrically face the chordal side 14*a* of the locking hole 14 as well as the engagement of each of the convex portions 15 with each of the grooves 33 places double limitations on the rotation of the inflator 30. Accordingly, this arrangement results in a reduction in play of the inflator 30 in the rotational direction, compared with an inflator securing structure in which limitations are placed on the rotation of the inflator 30 only by the flat surface 32*a* in the fixed shaft 32 symmetrically facing the chordal side 14*a* in the locking hole 14. This enables play of the inflator 30 in the rotational direction to be reduced to the predetermined rotational tolerance range even for a smaller diameter fixed shaft 32.

In this inflator securing structure, since the fixed shaft 32 of the inflator 30 has a substantially D-shaped cross section, the position of a flat surface 32*a* on a circumference of the fixed shaft 32 can be used as an indicator for the correct position of the inflator 30, thereby enhancing workability for the installation of the inflator 30 on the retainer 10.

The airbag system 1 operates in the same manner as an ordinary airbag system. Namely, the inflator 30 spouts out gas in the event of a vehicle crash. The gas spouted from the inflator 30 is introduced into the airbag 20 through the gas inlet 21, causing the airbag 20 to inflate. The inflating airbag breaks the lid and deploys in front of a passenger sitting on the front passenger seat.

The embodiment mentioned above is an example of the present invention. The present invention is not limited to the embodiment above.

For example, although two sets of the grooves 33 as a concave portion and the convex portions 15 are provided in the embodiment above, the grooves 33 and the convex portions 15 being engaged with each other, only one or three or more sets may be provided.

The locking hole 14 may include a concave portion formed therein, while the fixed shaft 32 may include a convex portion to be engaged with the concave portion formed therein.

Although the embodiment mentioned above is an example of the application of the present invention to a passenger airbag system, the present invention can be applied to various types of airbag systems other than the passenger airbag system, including, for example, a driver airbag system and a rear passenger airbag system.

The disclosure of Japanese Patent application No. 2008-019312 filed on Jan. 30, 2008 is incorporated as a reference.

While the invention has been explained with reference to the specific embodiments of the invention, the explanation is illustrative and the invention is limited only by the appended claims.

What is claimed is:

1. An inflator securing structure for securing an inflator having substantially cylindrical shape to a retainer in an airbag system, comprising:
   a fixed shaft having a substantially D-shaped cross section and formed at one end of the inflator along an axial direction of the inflator; and
   a locking structure having a locking hole with a substantially D shape and formed in the retainer so that the locking hole is engaged with the fixed shaft,
   wherein one of the fixed shaft and the locking hole has at least one groove, and other of the fixed shaft and the locking hole has at least one convex portion engaging the groove.

2. An inflator securing structure according to claim 1, wherein the convex portion projects from an inner periphery of the locking hole toward a center thereof, and the groove is formed on a lateral surface of the fixed shaft and extends to a free end thereof along the axial direction of the inflator.

3. An inflator securing structure according to claim 2, wherein the fixed shaft has two said grooves, and the locking hole has two said convex portions, each of the convex portions engaging each of the grooves corresponding thereto.

4. An inflator securing structure according to claim 3, wherein the two grooves and the two convex portions are spaced apart from each other by approximately 90 degrees in phase angle, respectively.

5. An inflator securing structure according to claim 4, wherein the grooves are located in a curved lateral surface of the fixed shaft, and the convex portions are located on the inner periphery of the locking hole corresponding to the grooves.

6. An airbag system comprising:
   an airbag;
   the inflator for inflating the airbag;
   the retainer to which the airbag and the inflator are mounted; and
   the inflator securing structure according to claim 1.

7. An airbag system comprising:
   a folded airbag;
   a substantially cylindrical inflator for inflating the airbag, said inflator having a fixed shaft formed at one end thereof extending along an axial direction of the inflator, said fixed shaft having a substantially D-shaped cross section and at least one convex portion or groove at an outer portion thereof; and a retainer for receiving the folded airbag and the inflator, said retainer having an inflator attaching portion having a substantially D-shape hole for receiving the fixed shaft, and at least one groove or convex portion formed around the hole and engaging the at least one convex portion or groove of the fixed shaft.

8. An airbag system according to claim 7, wherein said fixed shaft has the groove extending axially from an end of the fixed shaft, and said hole has the convex portion extending inwardly from a periphery of the hole so that the shaft is inserted into the hole by engaging the groove with the convex portion.

* * * * *